M. P. BLOOM.
PISTON PACKING
APPLICATION FILED JUNE 3, 1919.

1,346,806.

Patented July 20, 1920.

INVENTOR.
Millard P. Bloom
BY
Mann & Co.
ATTORNEYS.

UNITED STATES PATENT OFFICE.

MILLARD P. BLOOM, OF MOUNT WASHINGTON, MARYLAND.

PISTON-PACKING.

1,346,806. Specification of Letters Patent. Patented July 20, 1920.

Application filed June 3, 1919. Serial No. 301,522.

*To all whom it may concern:*

Be it known that I, MILLARD P. BLOOM, a citizen of the United States, residing at Mount Washington, in the county of Baltimore and State of Maryland, have invented certain new and useful Improvements in Piston-Packings, of which the following is a specification.

My invention relates to improvements in packing rings for pistons and, among its objects, to provide an improved construction of ring that will effect a lubrication of the cylinder wall but which, on the up-stroke of the piston collects the surplus oil left on the wall during the down-stroke of the piston and utilizes that collected oil, because of an improved structure in the ring, to form an oil packing and cushion at the top circumferential edge of the ring. The collected oil is then forced into a trap provided in the ring so that, when the explosion takes place, the oil will be confined in the trap and away from the fire thereby preventing the formation of carbon in the cylinder and on the head of the piston.

A further object of the invention is to provide an improved construction of ring which will have a plurality of scraping edges all of which are located at points spaced from and below the extreme top side of the ring whereby to lubricate the cylinder wall as the piston goes up and clean the wall as the piston goes down and thereby minimize the waste of oil by preventing burning of the same when the explosion takes place, and materially decreases the accumulation of carbon in the cylinder.

With these, and other objects in view, the invention is illustrated in the accompanying drawing, wherein,—

Figure 1:
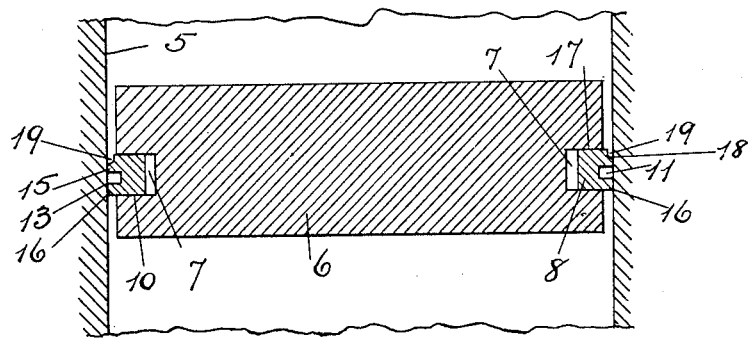
Figure 1 shows a portion of a piston head in a cylinder and with my improved ring attached to the head and bearing against the cylinder wall.

Referring to the drawing the numeral 5, designates the wall of cylinder and 6 the piston head which is to travel in said cylinder.

As is common in devices of this character I provide the piston head 6 with one or more annular circumferential grooves 7, in which I place my improved packing ring 8. The ring has a split 9, in order to permit the same to expand and effect a close contact with the cylinder wall in the usual manner.

My invention particularly resides in the construction of ring whereby I eliminate an up-scraping edge at the extreme top side of the ring and locate such up-scraping edge or edges on the ring at a point below said top ring-edge and, particularly, at the lower side of an oil-trap groove which I provide in the circumference of the ring.

Figure 2:
Fig. 2 illustrates the detached ring in side elevation.

By reference to Fig. 2 of the drawing it will be seen that the improved ring has a split 9, which may be of any approved form; that it has a lower edge 10, and an annular circumferential groove 11, which latter extends all the way around the ring from one edge of the split to the opposite edge of the latter.

The lower side of the annular groove 11 is closed by a right-angled wall 12, whose edge 13, is sharp and forms a scraping-edge for the annular wall of the cylinder 5, only, however, when the piston head 6, makes an up-stroke. It is important to note that this up-scraping edge 13, of the ring has position at the bottom or lower side of the annular groove 11.

The upper side of the annular groove 11 is closed by a wall 14, having a sharp scraping edge 15, while the bottom or lower edge 10, of the ring has a scraping edge 16.

These two scraping edges 15 and 16 are both brought into scraping operation on the cylinder wall 5, when the piston head 6, makes its down-stroke, and whatever oil is scraped from the cylinder wall by the down-scraping edge 15, is collected in the annular groove or trap 11, when the piston moves down and is liberated from that groove to lubricate the cylinder wall when the piston makes an up-stroke.

Figure 3:
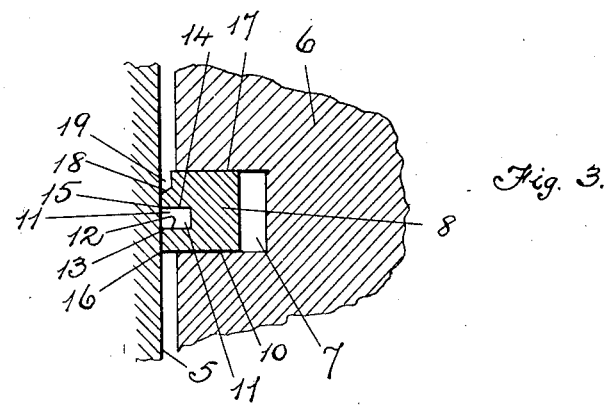
Fig. 3 shows an enlarged sectional detail through a portion of the piston, the ring and the cylinder.

It is to be particularly noted that the top 17 of the piston-ring is of a slightly less diameter than the bottom 10 of the same and that a circumferential shoulder 18, is formed around the ring between the annular ring-groove 11, and said top 17. This reduction in diameter at the top and the formation of the shoulder 18, produces a decidedly novel feature in construction and operation when the piston containing this ring is placed in a cylinder because it forms an annular space, gap or pocket 19, between the ring and cylinder wall 5, as best illustrated in the enlarged detail in Fig. 3, of the drawing.

This space, gap or pocket 19, serves a particularly useful purpose on the up-stroke of the piston in that oil from the cylinder wall is accumulated therein and particularly on the compression stroke forms a cushion or packing,—the oil finding its way down into the groove or trap 11, and being carried down by the scraping edge 15, and again liberated to lubricate the cylinder wall when the succeeding up-stroke takes place.

By means of this improved ring it will be seen that on the up-stroke, oil in the trap 11, will effect a lubrication of the cylinder wall and at the same time oil will be collected in the annular pocket 19, to form a packing. On the down-stroke the two scraping edges 15 and 16 will remove practically all oil from the cylinder wall where it would carbonize. The ring therefore not only effects a distribution of the oil but it minimizes the chances of carbon accumulation and increases the compression by utilizing the film of oil on the cylinder wall on the up-stroke to form a packing or cushion in the pocket 19.

Having described my invention, I claim,—

A packing-ring comprising a split spring ring having an upper portion of one diameter bounded by a downwardly and outwardly-sloping annular ledge wholly on the exterior of the ring and around the upper circumference thereof, and below said downwardly and outwardly-sloping ledge the said ring having a diameter greater than the diameter of said upper portion, said ring around said greater diameter being provided with an annular oil-trap groove which groove has a down-scraping edge at its upper side and between the down-scraping edge of the groove and the said outwardly-sloping exterior ledge above it said ring having a circumferential bearing face whereby the upper edge of said face at the base of the exterior ledge will form an oil-packing point on the compression stroke of the piston and the lower edge of said face at the upper side of the oil-trap groove will form a packing point on the suction stroke of the piston.

In testimony whereof I affix my signature.

MILLARD P. BLOOM.